(12) United States Patent
Harlacher et al.

(10) Patent No.: US 9,237,164 B2
(45) Date of Patent: Jan. 12, 2016

(54) SYSTEMS AND METHODS FOR CAPTURING, REPLAYING, OR ANALYZING TIME-SERIES DATA

(71) Applicant: VECTRA NETWORKS, INC., San Jose, CA (US)

(72) Inventors: James Harlacher, San Jose, CA (US); Mark Abene, San Jose, CA (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/309,873

(22) Filed: Jun. 19, 2014

(65) Prior Publication Data

US 2015/0082433 A1    Mar. 19, 2015

Related U.S. Application Data

(63) Continuation of application No. 13/648,176, filed on Oct. 9, 2012, now abandoned.

(51) Int. Cl.
*H04L 29/06* (2006.01)
*G06F 3/06* (2006.01)

(52) U.S. Cl.
CPC .......... *H04L 63/1425* (2013.01); *G06F 3/0619* (2013.01); *G06F 3/0656* (2013.01); *G06F 3/0689* (2013.01); *H04L 63/1458* (2013.01)

(58) Field of Classification Search
None
See application file for complete search history.

(56) References Cited

U.S. PATENT DOCUMENTS

| 7,505,416 | B2* | 3/2009 | Gordy et al. ................. 370/241 |
| 7,711,006 | B2* | 5/2010 | Dries et al. .................. 370/474 |
| 2004/0039867 | A1 | 2/2004 | Apfeldorfer et al. |
| 2006/0111961 | A1 | 5/2006 | McQuivey |
| 2006/0111962 | A1 | 5/2006 | Holsinger |
| 2008/0229415 | A1* | 9/2008 | Kapoor et al. ................. 726/22 |
| 2010/0281539 | A1 | 11/2010 | Burns et al. |
| 2011/0023106 | A1* | 1/2011 | Murotake et al. ............... 726/11 |
| 2011/0285729 | A1* | 11/2011 | Munshi et al. ................ 345/536 |

OTHER PUBLICATIONS

Anderson, Eric, "Capture, conversion, and analysis of an intense NFS workload," static.usenix.org/eent/fast09/tech/full_papers/anderson/anderson_html/index.html, Jul. 10, 2012, pp. 1-20, US.

(Continued)

*Primary Examiner* — David Le
*Assistant Examiner* — Devin Almeida
(74) *Attorney, Agent, or Firm* — Vista IP Law Group, LLP

(57) ABSTRACT

Provided is an intrusion detection system configured to detect anomalies indicative of a zero-day attack by statistically analyzing substantially all traffic on a network in real-time. The intrusion detection system, in some aspects, includes a network interface; one or more processors communicatively coupled to the network interface; system memory communicatively coupled to the processors. The system memory, in some aspects, stores instructions that when executed by the processors cause the processors to perform steps including: buffering network data from the network interface in the system memory; retrieving the network data buffered in the system memory; applying each of a plurality of statistical or machine-learning intrusion-detection models to the retrieved network data; aggregating intrusion-likelihood scores from each of the intrusion-detection models in an aggregate score, and upon the aggregate score exceeding a threshold, outputting an alert.

19 Claims, 8 Drawing Sheets

(56) References Cited

OTHER PUBLICATIONS

Bahri, Emna et al., "A multiple Classifier System Using an Adaptive Strategy for Intrusion Detection," International Conference on Intelligent Computational Systems (CICs'2012), Jan. 7-8, 2012, pp. 124-128, Dubai.

Balupari, Ravindra et al., "Real-time Network-Based Anomaly Intrusion Detection," School of EECS, Ohio University, Athens, OH 45701, pp. 1-20, US.

Bigelow, David et al., Valmar: "High-Bandwidth Real-Time Streaming Data Management," 2012 IEEE 28th Symposium on Communication, Networking & Broadcasting ; Components, Circuits, Devices & Systems ; Computing & Processing (Hardware/Software) ; Engineered Materials, Dielectrics & Plasmas ; Fields, Waves & Electromagnetics ; Power, Energy, & Industry Applications ; Robotics & Control Systems, 2012, pp. 1-6, US.

Brugger, S. Terry, "Data Mining Methods for Network Intrusion Detection, Chapter 1: Overview and previous work," University of California, Davis, Jun. 9, 2004, pp. 1-6, US.

Donaldson, Jonathon W., "Anomaly-based Botnet Detection for 10 Gb/s Networks," Thesis presented to the Faculty of the Graduate School of the Rochester Institute of Technology, May 2007, pp. 1-69, US.

Fan, Wei et al., "Using Artificial Anomalies to Detect Unknown and Known Network Intrusions," Columbia University, pp. 1-8, US.

Farid, Dewan MD. et al. "Attribute Weighting with Adaptive NBTree for Reducing False Positives in Intrusion Detection," International Journal of Computer Science and Information Security, vol. 8 No. 1, 2010, pp. 19-26, US.

Farid, Dewan MD. et al., "Combining Naive Bayes and Decision Tree for Adaptive Intrusion Detection," International Journal of Network Security & Its Applications, vol. 2, No. 2, Apr. 2010, pp. 12-25, US.

Graham, Ian, "Achieving Zero-loss Multi-gigabit IDS—Results from Testing Snort on Endace Accelerated Multi-CPU Platforms," Information Security, 2006, pp. 15-17, US.

Hu, Weiming et al., "AdaBoost-Based Algorithm for Network Intrusion Detection," IEEE Transactions on Systems, Man, and Cybernetics-Part B: Cybernetics, vol. 38, No. 2, Apr. 2008, pp. 577-583. US.

Hwang, Kai et al., "Hybrid Intrusion Detection with Weighted Signature Generation over Anomalous Internet Episodes," IEEE Transactions of Dependable and Secure Computing, vol. 4, No. 1, Jan.-Mar. 2007, pp. 1-15, US.

Lee, Wenke et al., "Real Time Data Mining-based Intrusion Detection," Proceedings of the 2001 DARPA Information Survivability Conference and Exposition (DISCEX II) Anaheim, CA, Jun. 2001, pp. 1-13, US.

Liao and Vemuri, "Using Text Categorization Techniques for Intrusion Detection," University of California, Davis, pp. 1-9, US.

Mukkamala, Srinivas et al., "Intrusion-detection using an ensemble of intelligent paradigms, Journal of Network and Computer Applications," 2005, vol. 28, pp. 167-182, US.

Peng, Tao et al., "Survey of Network-Based Defense Mechanisms Countering the DoS and DDoS Problems, ACM Computing Surveys," Apr. 2007, vol. 39, No. 1, pp. 1-8, US.

Rizzo, Luigi et al., "10 Gbits/s Line Rate Packet Processing Using Commodity Hardware: Survey and new Proposals," pp. 1-8, US.

Rubens, Paul, Endace: "The 'Google of Packets', Enterprise Networking Planet," Mar. 28, 2012, pp. 1-3, US.

Shavlik and Shavlik, "Selection, Combination, and Evaluation of Effective Software Sensors for Detecting Abnormal Computer Usage," KDD 04, Seattle, Washington, Aug. 22-25, 2004, pp. 1-10, US.

Spooner and Donnelly, "Monitoring and Transport with compromise: The case for independent network monitoring infrastructure," Endace Accelerated, pp. 1-8, US.

Vasiliadis, Giorgos et al., "MID3A: A Multi-Parallel Intrusion Detection Architecture," CCS'11, Chicago, Illinois, Oct. 17-21, 2011, pp. 1-12, US.

Wagner, Mark, 10 Gb Ethernet, The Fourth Annual Red Hat Summit, Boston, Mass., Jun. 18-20, 2008, pp. 1-5, US.

"SNORT Users Manual 2.9.2," The Snort Project, Dec. 7, 2011, pp. 1-238, US.

National Instruments, "Event-Driven Circular Hard Disk Data Buffering," www.ni.com, Sep. 6, 2006, pp. 1-8, US.

Wikipedia, the free encyclopedia, "Circular buffer," en.wikipedia.org/wiki/Circular_buffer, Jul. 10, 2012, pp. 1-9, US.

Endace, "Endace Application Suite," endace.com, pp. 1-3, US.

Wikipedia, the free encyclopedia, "Ensemble learning," en.wikipedia.org/wiki/Ensemble_learning, Jul. 10, 2012, pp. 1-7, US.

Wikipedia, the free encyclopedia, "Intrusion detection system," en.wikipedia.org/wiki/Intrusion_detection_system, Jul. 10, 2012, pp. 1-7, US.

Wikipedia, the free encyclopedia, "Anomaly-based Intrusion detection system," en.wikipedia.org/wiki/Intrusion_detection_system, Jul. 10, 2012, pp. 1-2, US.

"Endace Network Monitoring Tools," www.endace.com/endace-brings-100-percent-visability-to-high-speed-networks.html, Jul. 10, 2012, pp. 1-5, US.

Endace, "Network Security anomaly detection module," endace.com, pp. 1-2, US.

PRO security zone, "Capture Replay for Intrusion Detection," prosecurityzone.com/News/IT_security/ . . . /Capture_replay_for_intrusion_detection_17696.asp, Jul. 10, 2012, pp. 1-2, US.

Non-Final Office Action dated Jun. 12, 2014 for U.S. Appl. No. 13/648,176.

* cited by examiner

SYSTEMS AND METHODS FOR CAPTURING, REPLAYING, OR ANALYZING TIME-SERIES DATA

CROSS REFERENCE TO RELATED APPLICATION(S)

This application is a continuation of U.S. patent application Ser. No. 13/648,176, filed on Oct. 9, 2012, entitled "SYSTEMS AND METHODS FOR CAPTURING, REPLAYING, OR ANALYZING TIME-SERIES DATA", which is hereby incorporated by reference in its entirety for all purposes.

BACKGROUND

1. Field of the Invention

The present disclosure relates generally to data processing and, more specifically, to capturing, replaying, and analyzing time-series data.

2. Description of the Related Art

In recent years, it has become increasingly difficult to detect malicious activity carried on networks. The volume of traffic moving through a given node on modern networks is substantially larger than even in the recent past, making it more difficult to assess whether any particular portion of the data conveyed will cause harm. Further, the sophistication of attacks has increased substantially, as entities with greater resources, such as organized crime and state actors, have directed resources towards developing new modes of attack. Many existing intrusion detection systems fail to assess network traffic at the rates supported by modern networking equipment and at desired levels of accuracy and are, thus, vulnerable to being overwhelmed, for example, with a denial of service attack. Similar problems are present in other fields in which data is captured, replayed, or analyzed at relatively high rates.

SUMMARY

The following is a non-exhaustive listing of some aspects of the present techniques. These and other aspects are described in the following disclosure.

Some aspects include an intrusion detection system configured to detect anomalies indicative of a zero-day attack by statistically analyzing substantially all traffic on a network in real-time. The intrusion detection system, in some aspects, includes a network interface; one or more processors communicatively coupled to the network interface; system memory communicatively coupled to the processors. The system memory, in some aspects, stores instructions that when executed by the processors cause the processors to perform steps including buffering network data from the network interface in the system memory; retrieving the network data buffered in the system memory; applying each of a plurality of statistical or machine-learning intrusion-detection models to the retrieved network data; aggregating intrusion-likelihood scores from each of the intrusion-detection models in an aggregate score, and upon the aggregate score exceeding a threshold, outputting an alert.

Some aspects include a tangible non-transitory machine-readable medium storing instructions that when executed by a data processing apparatus cause the data processing apparatus to perform operations including buffering network data from a network interface in system memory; retrieving the network data buffered in the system memory; applying each of a plurality of statistical or machine-learning intrusion-detection models to the retrieved network data; aggregating intrusion-likelihood scores from each of the intrusion-detection models in an aggregate score, and upon the aggregate score exceeding a threshold, outputting an alert.

Some aspects include a process, including buffering network data from a network interface in a system memory; retrieving the network data buffered in the system memory; applying each of a plurality of statistical or machine-learning intrusion-detection models to the retrieved network data; aggregating intrusion-likelihood scores from each of the intrusion-detection models in an aggregate score, and upon the aggregate score exceeding a threshold, outputting an alert.

Some aspects include an intrusion detection system, including a network interface; one or more processors communicatively coupled to the network interface; system memory communicatively coupled to the processors; and system storage communicatively coupled to the processors. In some aspects, the system storage stores instructions that when executed by the processors cause the intrusion detection system to perform steps, including writing network data from the network interface to a buffer in the system memory; and concurrent with writing the network data to the buffer in the system memory, writing the network data from the buffer in the system memory to the system storage.

Some aspects include a tangible non-transitory machine-readable medium storing instructions that when executed by a data processing apparatus cause the data processing apparatus to perform operations, including writing network data from a network interface to a buffer in the system memory, wherein writing the network data from the network interface to the buffer in the system memory includes writing the network data to an active unlocked sub-buffer among the plurality of sub-buffers, locking the active sub-buffer, designating an unlocked sub-buffer as the active sub-buffer, and after ascertaining that the network data stored in the locked sub-buffer has been written to system storage, unlocking the locked sub-buffer; and concurrent with writing the network data to the buffer in the system memory, writing the network data from the buffer in the system memory to the system storage.

Some aspects include a process, including writing network data from a network interface to a buffer in the system memory, wherein writing the network data from the network interface to the buffer in the system memory, includes writing the network data to an active unlocked sub-buffer among the plurality of sub-buffers, locking the active sub-buffer, designating an unlocked sub-buffer as the active sub-buffer, and after ascertaining that the network data stored in the locked sub-buffer has been written to system storage, unlocking the locked sub-buffer; and concurrent with writing the network data to the buffer in the system memory, writing the network data from the buffer in the system memory to the system storage.

Some aspects include an intrusion detection system, including a network interface; a plurality of processors communicatively coupled to the network interface; system memory communicatively coupled to the plurality of processors; system storage communicatively coupled to the plurality of processors. In some aspects, the system storage stores previously captured network data and instructions that when executed by the plurality of processors cause the intrusion detection system to perform steps including pre-processing the network data in the system storage by calculating offsets defining batches of the network data sized such that each batch substantially fills a buffer; moving a batch of the network data from the system storage to a buffer in the system memory, wherein the batch is stored between a pair of the calculated offsets in the system storage prior to moving; concurrent with writing network data to the buffer, sending network data in the buffer to the network interface, wherein sending the network data includes reading time-stamps associated with packets in the network data, and sending each packet when the associated time stamp corresponds with a time stamp counter of at least one of the processors.

Some aspects include a process, including pre-processing network data stored in system storage by calculating offsets defining batches of the network data sized such that each batch substantially fills a buffer; moving a batch of the network data from the system storage to a buffer in the system memory, wherein the batch is stored between a pair of the calculated offsets in the system storage prior to moving; concurrent with writing network data to the buffer, sending network data in the buffer to a network interface, wherein sending the network data includes reading time-stamps associated with packets in the network data, and sending each packet when the associated time stamp corresponds with a time stamp counter of a processor.

Some aspects include a tangible, machine-readable, non-transitory medium storing instructions that when executed by a data processing apparatus cause the data processing apparatus to perform operations including pre-processing network data stored in system storage by calculating offsets defining batches of the network data sized such that each batch substantially fills a buffer; moving a batch of the network data from the system storage to a buffer in the system memory, wherein the batch is stored between a pair of the calculated offsets in the system storage prior to moving; concurrent with writing network data to the buffer, sending network data in the buffer to a network interface, wherein sending the network data includes reading time-stamps associated with packets in the network data, and sending each packet when the associated time stamp corresponds with a time stamp counter of a processor.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
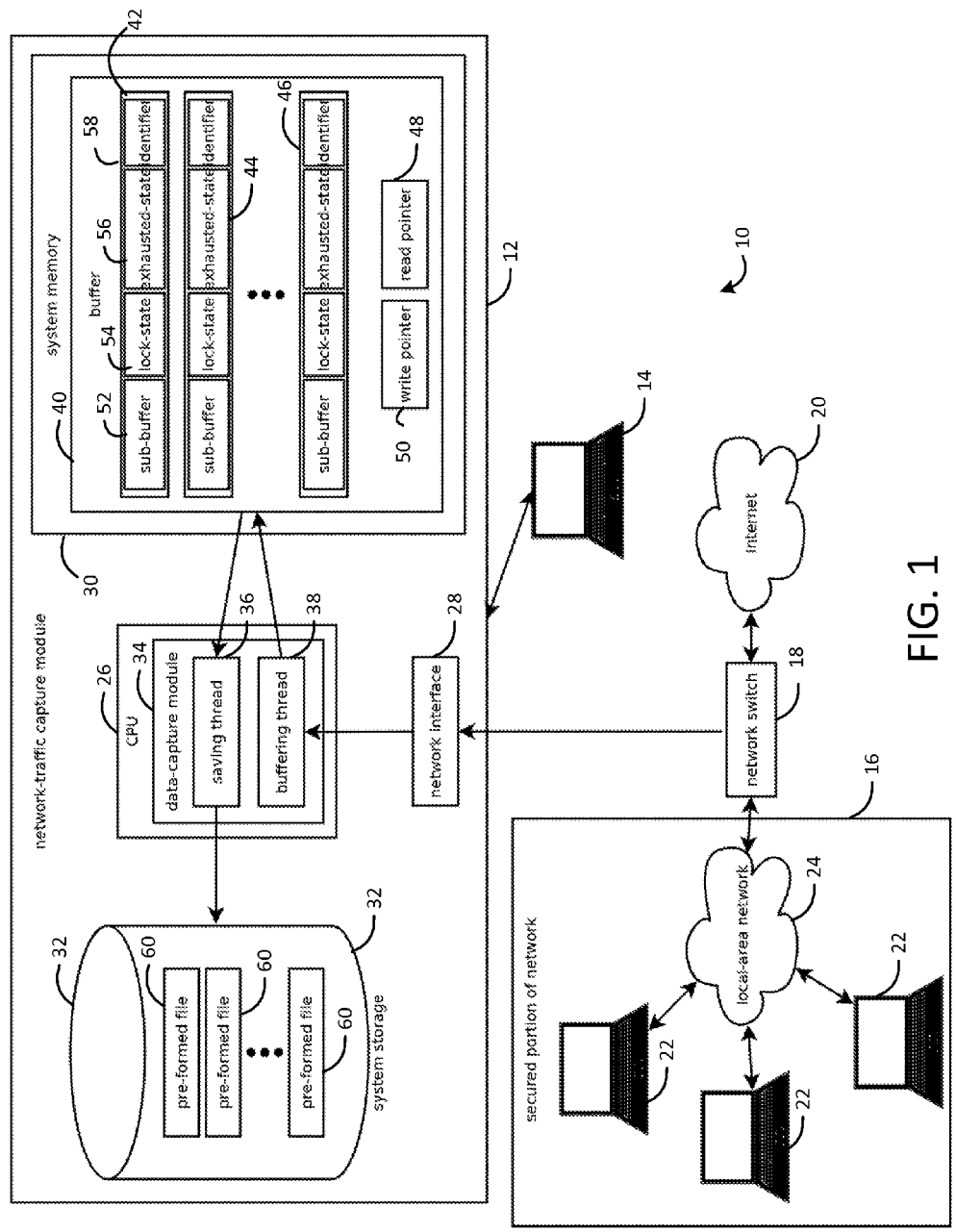
FIG. 1 illustrates a network-traffic capture module in accordance with embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIGS. 1-8 describe systems and processes for capturing, replaying, or analyzing time-series data (e.g., network data passing through a network node over time) at a relatively high rate (for example, 10 gigabit (Gb) per second or faster), using relatively inexpensive, off-the-shelf commodity computing components. These techniques may be combined in a single system, e.g., an intrusion detection system, having different modes of operation for capture, replay, and analysis. But, it should be noted that these techniques may be used separately in different systems and applications, e.g., for data capture or replay in contexts other than detecting intrusions in network traffic. The techniques are also applicable to systems using non-commodity, customized computing hardware, as such components are also expected to benefit from use of the techniques described herein, and applications are not limited to network data, as other forms of data may be processed in accordance with some embodiments.

FIG. 1 illustrates an example of a computing environment 10 having a network-traffic capture module 12 that, in some embodiments, is operative to capture network traffic (or other types of data) at a relatively high rate. The network-traffic capture module 12, in some implementations, uses multiple threads for buffering network data in memory (e.g., dynamic random access memory) and storing the buffered network data in system storage (e.g., a hard disk drive or solid-state drive providing persistent storage in the absence of power). As explained in greater detail below, in some implementations, the buffered network data is written to one of a plurality of sub-buffers in system memory and, concurrently, other sub-buffers in system memory are saved into pre-formed files in system storage. Embodiments of this buffering technique are expected to accommodate variations in the rate with which data is written to system storage, variations which could otherwise cause the loss of data when attempting to write data at rates nearing the specified maximum rates for the system storage components. Further, embodiments expedite the process of writing data to system storage by overwriting pre-formed files, again, as explained in greater detail below with reference to FIGS. 1, 2, and 3.

In some embodiments, the computing environment 10 includes, in addition to the network-traffic capture module 12, an administrator device 14, a secured portion of a network 16, and a network switch 18 coupled to the Internet 20.

The administrator device 14 includes an interface by which an administrator issues commands to control the network-traffic capture module 12 and by which an administrator views information output by the network-traffic capture module 12, such as status information indicating the state of an ongoing process of capturing network traffic.

The secured portion of the network 16 may include a plurality of computers 22, such as desktop computers, laptop computers, tablet computers, smart phones, and the like, connected to a local area network 24, such as an intranet, that is connected to the Internet 20 via the network switch 18. The networks 24 and 20 may convey data encoded in packet-based protocols, such as Internet Protocol and TCP, UDP, FTP, the like, in a sequence of packets through the network switch 18. In some use cases, the network 20 and data-capture module 12 may be co-located, e.g., in the same building, on the same intranet, to reduce latency relative to remote uses, or the data-capture module 12 may be remote. The secured portion of the network 16 may reside behind a firewall and an intrusion detection system, in some embodiments, such as the intrusion detection system described below with reference to FIGS. 7 and 8. In contrast, the Internet 20 is generally unsecured, and various attacks may pass through the Internet 20 along with legitimate traffic to or from the computing devices 22 in the secured portion of the network 16. Further, the secured portion may also generate outgoing traffic indicative of an intrusion. In some use cases, a relatively large amount of data per unit time is exchanged between the secured portion of the network 16 and the Internet 20 through the network switch 18, such as approximately 1 Gb per second, 10 Gb per second, or 40 Gb per second, for example.

In some cases, a portion of the data passing through switch 18 is indicative of an attack, such as a distributed denial of service attack, a brute force attempts to test passwords, SQL injection, buffer overflow, or other form of attack. Or the data can be verified to be intrusion free. Capturing this data (e.g., intrusion free data) over some period of time, such as a duration of greater than or approximately 1 minute, 10 minutes, one hour, one day, or one week, is often useful for providing a training set for an intrusion detection system, such as the intrusion detection systems described herein. Part of the indication of some attacks includes the timing of the constituent packets arriving at the switch 18, and some attacks may be signaled by a very small portion of the network traffic.

However, inexpensive commodity computing hardware, using conventional techniques, is often incapable of reliably capturing data above certain data rates, e.g., capturing 100% of the traffic, or approximately 100%, for instance greater than 80% of the traffic, or less depending on the application. In some embodiments, the network-traffic capture module 12 performs processes that allow the module 12 to capture data at higher rates than is possible using traditional techniques with a given set of computing hardware. It should be noted, however, that the techniques described herein address a number of problems that arise in the context of intrusion detection systems and not all embodiments relate to capturing network traffic. Further, the techniques described herein are broadly applicable in fields other than intrusion detection systems, for example in data capture modules for high data rate sensors, capturing high-frequency trading data, or other systems in which data is captured at a high rate, for example within 20% of the specified maximum data rate of components in the network traffic capture module 12.

In this embodiment, the network-traffic capture module 12 is a computing device, such as a rack-mounted computing device (e.g., consuming four units of rack space), such as a computing device having a single chassis (or more) and a single motherboard (or more). Or components may be distributed or replicated across multiple computing devices, e.g., with one device capturing odd-numbered packets and another device capturing even-numbered packets. The illustrated network-traffic capture module 12 includes a central processing unit (CPU) 26, a network interface 28, system memory 30, and system storage 32. The components 26, 28, 30, and 32 may be physically coupled to one another in a rack-mounted computing device, such as an intrusion detection appliance for installation at a user's site, and the CPU 26 and system memory may be coupled directly to one another via a system board, e.g., via one or more memory channels on a motherboard. The network-traffic capture module 12 may also include other features that are not shown, such as a power supply and ports for interfacing with various input/output devices, such as a keyboard and monitor.

The CPU 26 may be any of a variety of different types of CPUs, e.g., a multicore CPU capable of hyperthreading, such as a six core Xeon 5690 CPU, in which each core supports two hyper threads, available from Intel Corporation of Santa Clara, Calif. In some cases, the CPU includes a memory controller operable to communicate with system memory 30 using various memory standards, such as DDR3. The illustrated CPU 26 also communicates with the network interface 28 and the system storage 32 to move data from the network interface 28 to system memory 30 and then to system storage 32. The CPU 26 executes an operating system, such as Ubuntu Linux, along with a data-capture module 34, which may be embodied by program code stored on a tangible, non-transitory, machine-readable medium, such as system memory 30 or system storage 32, and which when executed by the CPU 26, causes the CPU 26 to perform the operations described below with reference to FIGS. 2 and 3.

The data-capture module 34 of this embodiment further includes a saving thread 36 and a buffering thread 38 that operate concurrently to move data from the network interface 28 into system memory 30 and from system memory 30 into the system storage 32, as described in greater detail below. In other embodiments, threads 36 and 38 may be separate processes, rather than threads of a single process, and some embodiments may include multiple instances of each thread 36 or 38.

FIG. 1 illustrates a number of functional blocks as discrete components, but it should be noted that code or hardware by which these functional blocks are implemented may be conjoined, distributed, intermingled, or otherwise differently organized relative to FIG. 1. Further, while the saving thread 36 and buffering thread 38 are illustrated as separate threads, embodiments are not limited to this arrangement. For example, the saving thread and the buffering thread may be provided by a multiple instances of a thread that changes from a loading mode to a buffering mode and back periodically, in some use cases.

The network interface 28, in some embodiments, is a network-interface card capable of sending or receiving data on a network, such as an Ethernet network, at approximately 1 Gb per second, 10 Gb per second, or 40 Gb per second, for instance. The network interface 28 may include additional buffers that are distinct from those described below with reference to the system memory 30, or in some embodiments, buffers on the network interface 28 may provide the functionality described below with reference to the buffers in the system memory 30.

System memory 30 is random access memory, for example synchronous dynamic random access memory, such as a plurality of dual in-line memory modules of DDR3 SDRAM of an amount selected based on desired data capture rates and other factors. The system memory 30 stores various data structures operable to facilitate relatively rapid capture of data into system storage 32. In this embodiment, system memory 30 includes a buffer 40 having a plurality of sub-buffers 42, 44, and 46, and read and write pointers 48 and 50 that each identify one (e.g., one and only one) of the sub-buffers 42, 44, or 46. Each of the sub-buffers 42, 44, and 46 includes sub-buffer storage 52 where captured data is held, a lock 54, an exhausted-state value 56, and an identifier 58 (e.g., a unique identifier among the sub-buffers). Each sub-buffer storage 52 may be operable to store a discrete, predetermined amount of network traffic data from the network interface 28 before that network traffic data is written to system storage 32. In some embodiments, each sub-buffer storage 52 has a size between approximately 1.3 gigabytes for a 10 Gb data feed, for example, and some embodiments include approximately 10 sub-buffers. Other embodiments can have larger or smaller sub-buffers and more or fewer sub-buffers.

Each sub-buffer 42, 44, and 46 may be associated (e.g., in a one-to-one correlation) with a lock 54, having a state indicating whether the sub-buffer is either locked, meaning that the sub-buffer is not to receive additional network data, or unlocked, meaning that the sub-buffer is available to be overwritten. In some cases, the lock constitutes a mutual exclusion, or mutex, spin lock, semaphore, or other variable state configured to prevent two threads from accessing the sub-buffer at the same time. The exhausted-state value 56 has uses described below with reference to FIGS. 4-6 and, in some embodiments, may be omitted from the module 12, which is not to suggest that other features may not also be omitted in some embodiments.

Each sub-buffer 42, 44, and 46 may be further associated with an identifier 58 that, in some embodiments, uniquely identifies the sub-buffer among all of the other sub-buffers. The write pointer 50 may point to the sub-buffer to which data is currently being written from the network interface 28 by, for example, storing the identifier 58 of the corresponding sub-buffer. In some cases, the identifiers are integer values, and the write pointer 50 is a value that is incremented or decremented when advancing from one sub-buffer to the next when a sub-buffer is deemed full. The read pointer 48 points to a sub-buffer from which data is currently being read and transferred to system storage 32. In some cases, the read pointer 48 is a variable containing the value of the identifier of the corresponding sub-buffer. The buffer 40, in some cases, may be characterized as a last-in, first-out buffer or as a circular buffer, though embodiments are not limited to buffers consistent with these terms. The buffer 40, in some cases, is provided by a portion of the system memory 30 allocated to the data-capture module 34 by an operating system in which the data-capture module 34 is executing.

In some embodiments, the system storage 32 is a non-volatile form of memory, such as a solid-state drive or a hard disk drive, operable to store captured network traffic. In some embodiments, the system storage 32 is coupled to the CPU 26 via a SATA connection, a SAS connection, or via a PCI express connection. Examples of system storage consistent with the present techniques include the Cheetah-brand enterprise-grade hard disk drives from Seagate Technology, having principle offices in Cupertino, Calif. In some embodiments, the system storage may be organized into logical units that provide higher performance than individual drives would otherwise provide, such as in a RAID zero or a RAID 10 array. In this embodiment, the system storage includes pre-formed files 60 that are overwritten with network traffic. Overwriting a pre-formed file is believed to be faster than creating a new file structure to receive network traffic in the system storage, thereby facilitating the capture of data at higher rates than would otherwise be achieved. In some cases, the pre-formed files are formed by writing dummy data, such as a string of zeros, in a predetermined amount of space in the system storage, such as approximately one pre-formed file (or more) that receives data from a plurality of sub-buffers, e.g., a one or two terabyte file, depending on the application. The pre-form files 60 may be formed by creating the files before executing the data-capture module 34, in some embodiments.

Figure 2:
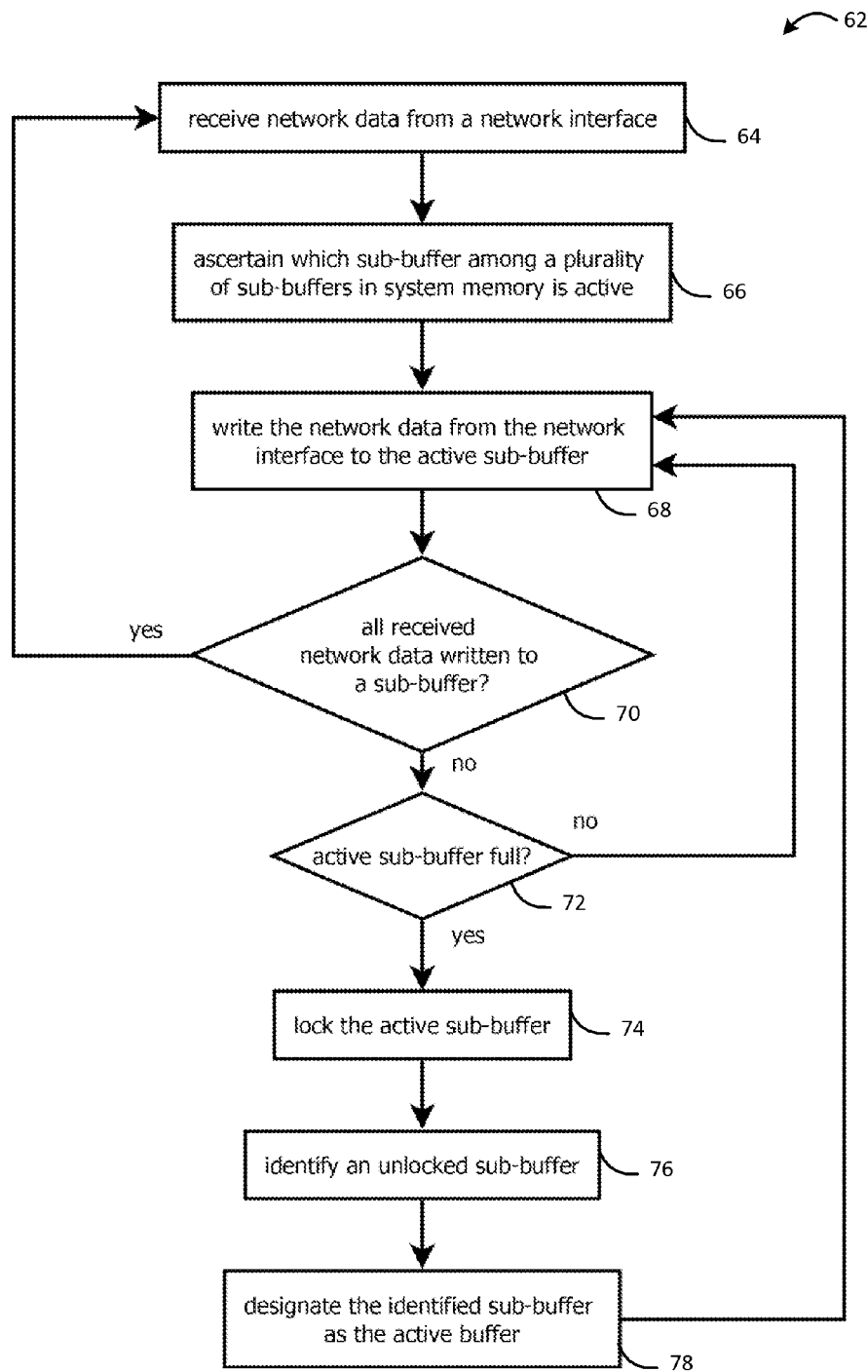
FIGS. 2 and 3 illustrates processes for capturing network traffic in accordance with embodiments of the present techniques.
Figure 3:
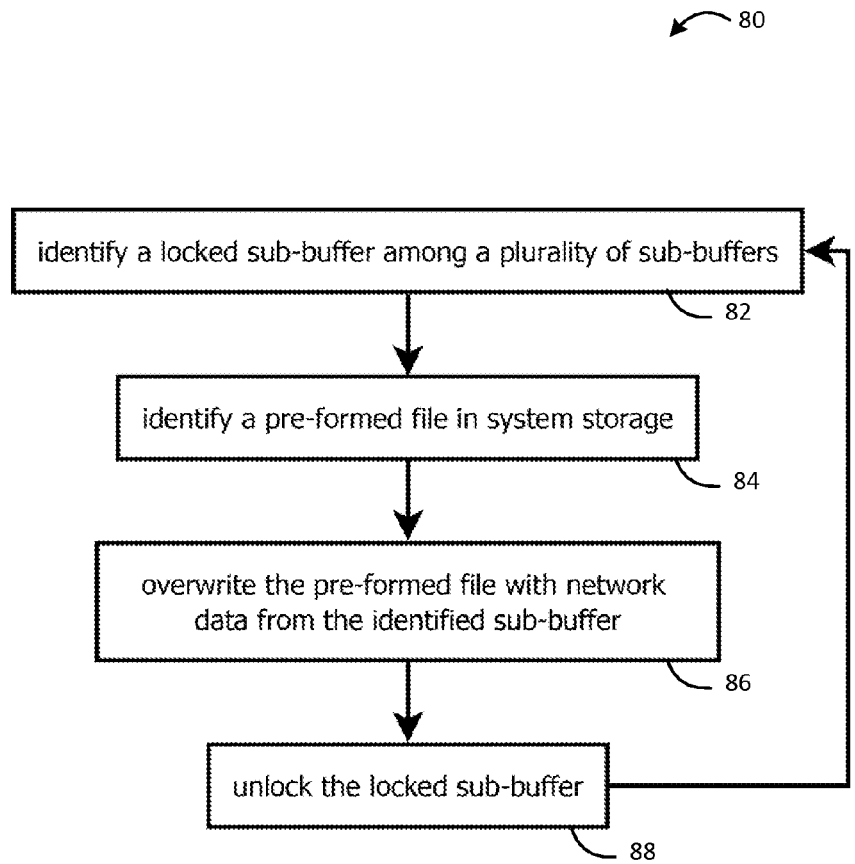

The network-traffic capture module 12 may be operable to capture network traffic at a relatively high rate using relatively inexpensive computing hardware. FIGS. 2 and 3 illustrate examples of processes by which the network-traffic capture module 12 captures data. The term "process" used herein refers to a method, which may correspond to a "process," as that term is used to describe computing tasks (described herein as "computing processes"), but the unmodified term "process" is not so limited, e.g., a single computing process may have multiple threads, each executing one of the processes of FIG. 2 or 3.

Specifically, FIG. 2 illustrates an example of a process 62 performed by the buffering thread 38 of FIG. 1. In this embodiment, the process 62 begins with receiving network data from a network interface, as illustrated by block 64. The network data may be received at a relatively high rate, such as those discussed above. In some cases, the network data is received using direct memory access into a buffer of a network interface card or using some other interface provided by a network card driver. The data passing through the network interface 28 may be mirrored by the network switch 18 described above, such that a copy of all (or substantially all, for example) network traffic passing through the network switch 18 is received by the network interface 28 and the buffering thread 38. Capturing all or substantially all network traffic is advantageous because some intrusion threats, such as a signal activating malware already installed, can be relatively small in size. The network data, in some cases, is data on an Ethernet network, encoded according to various protocols at various levels, including IP, TCP, UDP, FTP, HTTP, SPDY, and the like. The data may be encoded in packets having headers that identify an Internet Protocol address and port to which the packet is sent and from which the packet is received.

Receiving the network data from a network interface, in some embodiments, includes associating (for example, in a one-to-one relationship) a timestamp with the received packet, indicating a time at which the packet was received. In some cases, the timestamp is a timestamp counter value of the network interface 28 incremented according to a clock signal of the network interface 28, thereby providing relatively fine-grained documentation of the time at which packets are received for re-creating the flow of network traffic in accordance with techniques described below with reference to FIGS. 4 through 6. In some embodiments, receiving network data may entail receiving one and only one packet of network data in the step designated by block 64, with subsequent packets received in subsequent repetitions of step 64, such that each packet is associated with a timestamp, e.g., a time stamp having a resolution of less than one microsecond, for instance one nanosecond, and such that each packet has a unique (or approximately unique, e.g., shared by less than 10 packets) timestamp relative to the other packets.

The process 62, in some embodiments, further includes ascertaining which sub-buffer among a plurality of sub-buffers in system memory is active, as indicated by block 66. The sub-buffers may be those described above with reference to FIG. 1. Ascertaining which sub-buffer is active may include referencing a value stored in a write pointer that uniquely identifies the active sub-buffer among the plurality of sub-buffers 42, 44, and 46, such as a pointer to an address in memory of the sub-buffer or a variable that stores the identifier 58 of the sub-buffer.

In some embodiments, the process 62 further includes writing the network data from the network interface to the active sub-buffer, as indicated by block 68. Writing the network data from the network interface may include transmitting the network data to the above-mentioned random access memory forming system memory. In some embodiments, a driver of the network interface 28 may write the network data to a portion of system memory different from that of the buffer 40, and the buffering thread 38 may move (e.g., copy) the data from this portion of memory to one of the sub-buffers 42, 44, or 46. The network data may include the above-mentioned timestamp associated with each packet of network data and the respective packet size.

The process 62 may further include determining whether all (or substantially all) received network data is written to a sub-buffer, as indicated by block 70. In some embodiments, packets are received and written one packet at a time, and the determination 70 is performed by determining that the one packet has been written to a sub-buffer. In some cases, the determination 70 may be performed by, for example, requesting additional data from the network interface 28 described above. In response to determining that all receive data has been written, the process returns to step 64 and additional network data is received. In response to determining that all received network data has not been written to the sub-buffer, the process determines whether the active sub-buffer is full, as illustrated by block 72. In some embodiments, the determination of block 72 is made in a different order from what is illustrated, which is not to suggest that other blocks may not also be reordered. For example, some embodiments determine whether the active sub-buffer is full before determination 70 or in response to an affirmative determination at step 70. As noted above, each sub-buffer storage 52 may have a pre-defined buffer size, and each may be deemed full when the captured network data fully occupies that size, e.g., a sub-buffer may be deemed full when the occupied space exceeds the buffer size less a maximum specified packet size to prevent packets from spanning sub-buffers. In response to determining that the active-sub-buffer is not full, the process returns to step 68 and additional received network data is written to the active sub-buffer. Alternatively, in response to determining that the active-sub-buffer is full, the process proceeds to lock the active sub-buffer as indicated by step 74. Locking the active sub-buffer may include changing the state of a lock associated with the active sub-buffer, thereby indicating to other threads that the active sub-buffer contains data that has not yet been written to system storage and should not be overwritten. In this branch, the process 62 further includes identifying an unlocked sub-buffer, as indicated by block 76. Identifying an unlocked sub-buffer 76 may include incrementing or decrementing the above-mentioned write pointer 50 and determining whether the lock 54 corresponding to an identified sub-buffer indicates that that sub-buffer is unlocked. The process 62 may wait until the next sub-buffer is unlocked or, in other embodiments, iterate through each of the above-mentioned sub-buffers 42, 44, and 46 until an unlocked one is found. Identifying an unlocked sub-buffer may include uniquely identifying the sub-buffer among the plurality of sub-buffers.

The process 62 in this embodiment further includes designating the identified sub-buffer as the active buffer, as indicated by block 78. Designating the sub-buffer as the active buffer may include changing the above-mentioned write pointer to a value equal to the identifier of the new active sub-buffer. Upon designating the new active buffer, the process 62 returns to step 68 and additional network data is written to the new active buffer. Thus, the process 62 transfers received network data into sub-buffers in system memory. Further, the data in system memory is organized in sub-buffers that can be written as a group of data, which is expected to be faster than writing smaller increments of data in the sub-buffers, as fewer write commands are issued. Buffering the data further is expected to accommodate variations in the speed with which data is written to system storage, as often occurs with the movement of mechanical parts in hard disk drive and as a result of various processes executed by the operating system otherwise affecting the movement of data within the system.

FIG. 3 illustrates an embodiment of a process 80 performed by the above-mentioned saving thread 36 of FIG. 1 that moves data from the sub-buffers to system storage. In this embodiment, the process 80 includes identifying a locked sub-buffer among a plurality of sub-buffers, as indicated by block 82. Identifying a locked sub-buffer may include incrementing or decrementing the above-mentioned read pointer 48 and determining whether the read pointer 48 identifies a sub-buffer that is locked, meaning in this context that the sub-buffer contains data that has not yet been written to system storage.

The process 80 of this embodiment further includes identifying a pre-formed file in system storage, as indicated by block 84. Next, in this embodiment, the pre-formed file is overwritten with the network data from the identified sub-buffer, as indicated by block 86. As noted above, overwriting preformed files is expected to be faster than creating new files. Further, writing larger groups of data, such as an entire sub-buffer of data, is expected to be faster than writing data to system storage one packet at a time.

Finally, in this embodiment, the process 80 includes unlocking the locked sub-buffer, as indicated by block 88. Unlocking the locked sub-buffer includes changing the state of the above-mentioned lock, indicating that the corresponding sub-buffer can be overwritten without overwriting data that has not been stored in system storage.

The processes 62 and 80 may be executed concurrently (e.g., substantially simultaneously), for instance by different threads, to capture network data at a relatively high rate relative to systems in which processes 62 and 80 are executed consecutively, though embodiments are not limited to those performing concurrent operations. In some embodiments, one or more cores or hyperthreads execute process 62 concurrent with one or more other, different cores or hyperthreads executing process 80. Both threads may access the same memory structure of buffer 40 described above. Communication between the threads may occur via the above-mentioned locks 54 by which the threads coordinate memory access. For example, full sub-buffers may be locked with a mutex, a spinlock, a semaphore, or other variable that prevents the buffering thread from overwriting the locked sub-buffer until the saving thread unlocks the sub-buffer.

In other embodiments, a single, larger buffer provides some of the functionality of the plurality of sub-buffers 42, 44, and 46. For instance, a single circular buffer may receive network data at an address identified by the write pointer 50, and data may be written from the circular buffer to system storage from an address identified by the read pointer 48. Transfers to system storage may be initiated in response to a threshold condition obtaining, such as a more than a threshold amount of data being written between the read and write pointer addresses, or in response to data collection for more than a threshold amount of time.

The system of FIG. 1 and processes of the FIGS. 2 and 3, in some embodiments, are expected to facilitate the capture of network data at relatively high rates using relatively inexpensive commodity computing hardware, such as system boards, CPUs, RAM, and hard drives. In certain embodiments, the network data is buffered to accommodate variations in the rate at which the data is written to system storage, and the data is written to system storage in larger collections into pre-existing files because some forms of system storage are operable to write data at higher rates when the data is written in this fashion. It should be noted, however, that not all embodiments use these techniques. For example, at potentially higher cost, a larger amount of system storage may be provided in a RAID 0 array, such that data is written in parallel to a larger number of drives.

Figure 4:
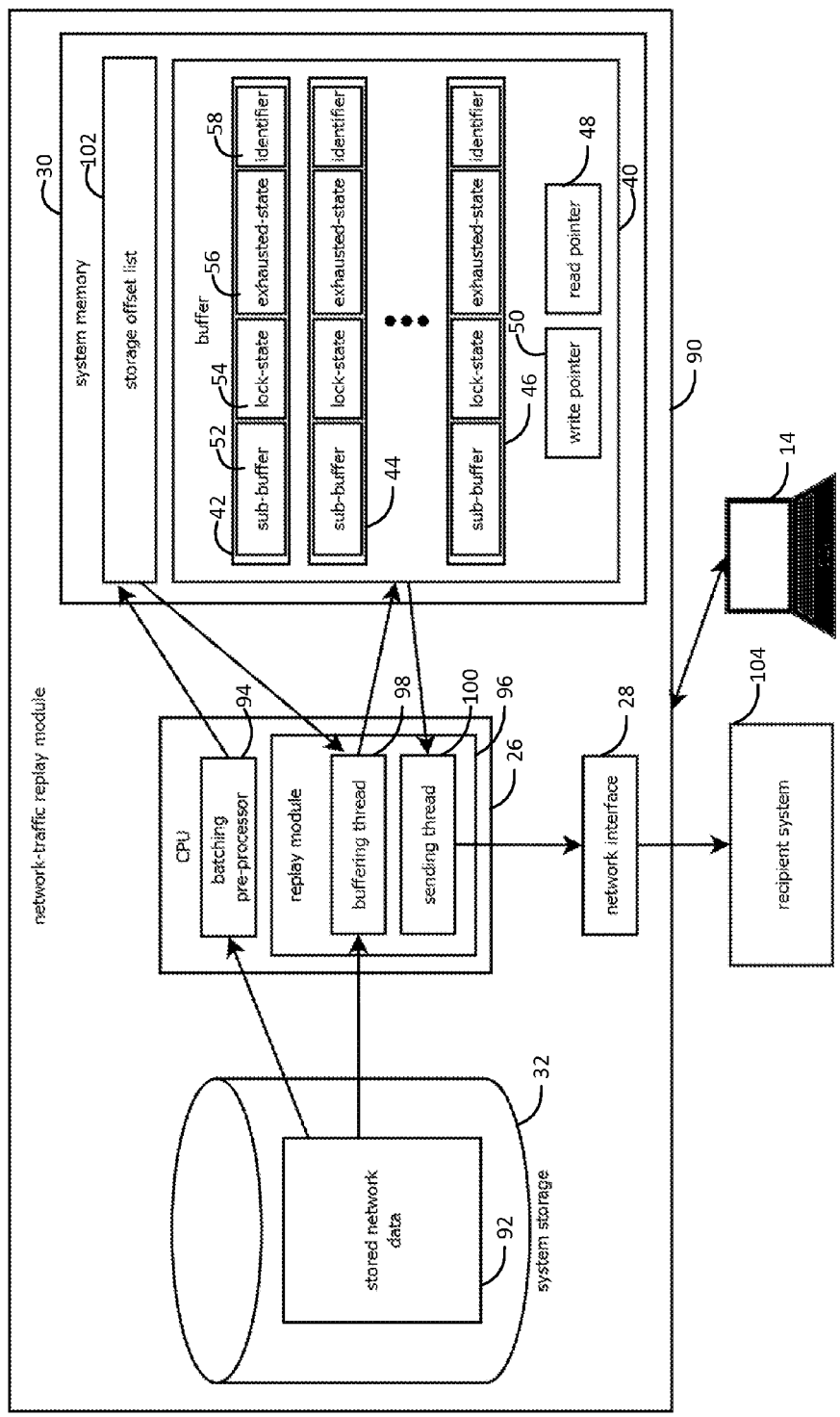
FIG. 4 illustrates a network-traffic replay module in accordance with embodiments of the present techniques.

FIG. 4 illustrates an embodiment of a network-traffic replay module 90 that, in some implementations, replays network traffic captured using this system and processes of FIGS. 1 through 3. As explained below, some embodiments replay such traffic at a higher data rate and with greater fidelity than is possible using traditional techniques. That said, not all embodiments described herein use the network-traffic replay module 90, and the module 90 is applicable in systems other than those described elsewhere in the present application.

The physical components of the network-traffic replay module 90 may be the same as those of the network-traffic capture module 12 described above with reference to FIG. 1, as indicated by the repetition of element numbers 26, 28, 30, and 32. In some embodiments, the network traffic replay module 90 is formed by operating the same computing device that forms the network-traffic capture module 12 in a replay mode rather than in a capture mode, e.g., in response to commands from the administrator device 14.

In this embodiment, the system storage 32 includes stored network data 92, which may be the captured data described above or may be data acquired through other techniques, for example simulated network data or data captured from other sources. Similarly, the system memory 30 includes the above-described buffer 40 in some embodiments.

When operating in replay mode, the CPU 26 may execute instructions that cause the CPU 26 to provide a batching pre-processor 94 and a replay module 96 having a buffering thread 98 and a sending thread 100. Further, when operated in replay mode, the CPU 26 may form in system memory (or system storage) a storage offset list 102. Each of these features 94, 96, 98, 100, and 102 are described in greater detail below with reference to FIGS. 5 and 6, which describe processes performed by these components. Generally, in some embodiments, the batching pre-processor 94 calculates offsets that define groups of data in the stored network data for transfer, as a group (e.g., in response to a single read command), to one of the sub-buffers 42, 44, or 46. These offsets may be calculated before replaying network data and may be stored in the storage offset list 102. In some use cases, the batching pre-processor 94 is not instantiated at the same time as the replay module 96. For example, the batching pre-processor 94 may be executed before the replay module 96 is instantiated to prepare the storage offset list 102 in advance of a replay of network traffic, and in some cases, the offset list 102 may be read from storage 32 before or when instantiating the replay module 96. And generally, in some embodiments, the buffering thread 98 may later use these offsets to read the groups of data from the stored network data to one of the sub-buffers 42, 44, and 46, and the sending thread 100 may send this data in accordance with timestamps associated with each packet in the data, thereby re-creating the flow of network traffic that was previously captured. The recreated flow of data may be directed to a recipient system 104, which may analyze the network traffic, for example testing or training candidate intrusion detection models for accuracy. The operation of the network-traffic replay module may be controlled by the administrator device 14, which may issue commands to the network-traffic replay module 90 that instantiate the batching pre-processor 94 and instantiate the replay module 96. Again, while the components of the network-traffic replay module 90 are illustrated as discrete functional blocks, it should be understood that hardware and software by which the functionality is provided may be distributed, conjoined, intermingled, or otherwise differently organized from the manner in which the functional blocks are illustrated.

Figure 5:
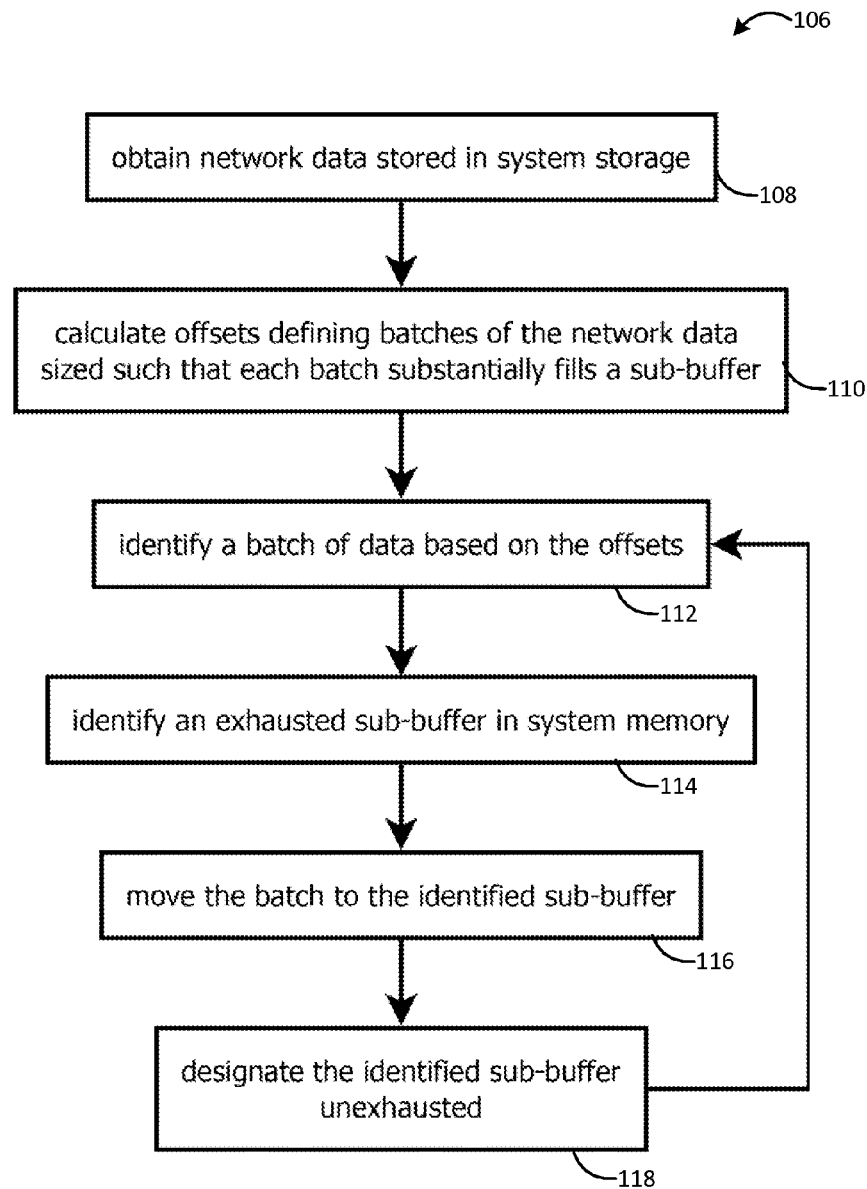
FIGS. 5 and 6 illustrates processes for replaying network traffic in accordance with embodiments of the present techniques.

FIG. 5 illustrates an embodiment of a process 106 for pre-processing and buffering network data to be replayed. The process 106 may facilitate relatively accurate recreations of the flow of network traffic at relatively high rates relative to the rates supported by the computing hardware. Further, the process 106 may reduce deviations in the rate at which packets are sent relative to the desired rate of sending packets (e.g., the rates at which packets were captured), as the rate of data transfer from the system storage 92 may occasionally deviate below the rate at which traffic is replayed.

In this embodiment, the process 106 includes obtaining network data stored in system storage, as illustrated by block 108. As noted above, the network data may be obtained in the computing environment 10 of FIG. 1 by executing the processes of FIGS. 2 and 3, or network data may be obtained with other techniques, for example network data may be simulated or obtained from some of the system. Further, it should be noted that the present techniques are not limited to network data and other types of data acquired over time may be replayed, for example relatively high bandwidth data from sensor arrays or market data generated by high-frequency trading activities.

The process 106, in some embodiments, includes calculating offsets defining batches of the network data sized such that each batch substantially fills a buffer, as illustrated by block 110. This step 110 may be performed by the above-described batching pre-processor 94, for example, automatically upon having captured network data, or in response to a command from the administrator device 14. The size of the sub-buffer storage 52 of the sub-buffers 42, 44, and 46 may be predefined and may be the same among each of the sub-buffers, in some embodiments. Further, the size of the sub-buffers may be substantially larger than packet of network data, for example the packets may be generally smaller than 1,514 bytes (or larger, such as approximately 9,000 bytes for jumbo frames), while the sub-buffer storage may be approximately 1.3 Gb, for example between 1.3 Mb and 1.3 Gb, depending on the time interval being buffered and the speed of the interface.

Substantially filling a sub-buffer may include filling a sub-buffer with a sequence of network data (e.g. network data in the order in which it arrived as indicated by timestamps) in sequence until the next packet in the sequence would overflow the sub-buffer. Thus, when pre-processing to calculate offsets, the packet that would otherwise overflow the sub-buffer may then be designated with an offset as corresponding to an offset marking the beginning of the network data for the next sub-buffer to be filled, and end of the proceeding packet may be designated with an offset as corresponding to the end of the network data to be read to a previous sub-buffer being filled. In some embodiments, the offsets are expressed as memory addresses in the system storage 32, such that the offsets bookend, or bracket, a block of network data (e.g., in a range of sequential addresses in system storage) substantially filling a sub-buffer (e.g. filling the sub-buffer with a sequence of network data constituting an integer number of network packets and without a packet spanning between sub-buffers).

Offsets may be calculated by, for example, designating an address of a start of a first packet in the sequence of network data as an initial offset and, then, iterating through the sequence of network packets, summing the size of each consecutive network packet with a running total until the sum exceeds the size of a sub-buffer's storage, at which time, the end of the preceding packet is designated as an ending offset, and the beginning of the packet after that packet is designated as the next beginning offset. In some cases, a single offset value (e.g., address in system storage) may designate both the end of a preceding group and the beginning of the next group of data.

The calculated offsets may be stored in system memory, for example in the storage offset list 102 or, in some use cases, the offsets are stored as a file in system storage 32 to be read into system memory 30 when replaying the stored network data 92. Pre-calculating the offsets is expected to facilitate the transfer of data from system storage to sub-buffers with relatively few read commands, which tends to facilitate higher rates of data transfer from system storage than transfers in which sub-buffers are filled with data from a plurality of read commands. That said, some embodiments may read data from system storage to a single sub-buffer with more than one read command by, for example, pre-calculating offsets for a relatively small number of groups of data collectively corresponding to a single sub-buffer, such as fewer than five or fewer than 10 groups of data. Further, in some embodiments, the offsets are calculated such that packets do not span sub-buffers, which facilitates appropriately timed replay of those packets, as the sending thread 100 need not access multiple sub-buffers to send a single packet. Or, in some cases, offsets may not be used. For instance, the data may be stored in a RAID zero array sized such that time is available to read data without pre-calculated offsets.

The process 106 further includes identifying a batch of data based on the offsets as illustrated by block 112. Block 112 and the subsequently described steps of FIG. 5 may be performed by the above-described buffering thread 98, for example sometime after steps 108 and 110 of FIG. 5 have been completed and in response to a replay command from administrator device 14. Identifying a batch of data based on offsets may be performed by obtaining a starting offset and an ending offset of a batch in the system storage from offset list 102, which may store an ordered list of offsets corresponding to, or expressed as, addresses in the system storage between which a sequence of network data is stored, where the sequence of network data forms a group of data that substantially fills one of the sub-buffers. Identifying the batch of data may include incrementing or decrementing a counter corresponding to a next entry in the list of storage offsets.

The process 106, in some embodiments, further includes identifying an exhausted sub-buffer in system memory 114. This step, like the other steps described with reference to the other processes herein, may be performed in a different order from the order in which the flow charts illustrate. For example, the sub-buffer may be identified before identifying the batch of data in step 112. Identifying an exhausted sub-buffer may include incrementing or decrementing the write pointer 50 of the buffer 40 of FIG. 4 and determining whether a corresponding sub-buffer is exhausted, e.g., as indicated by the exhausted state value 56. As explained below, sub-buffers are designated as exhausted when the sub-buffer does not contain data yet to be sent by the sending thread 100. In some cases, the write pointer 50 may determine that the next sub-buffer is not exhausted and wait until the state of that sub-buffer changes.

The process 106, in some embodiments, further includes moving (e.g., reading) the batch of data to the identified sub-buffer, as illustrated by block 116. The batch of data between the identified offsets, in some embodiments, may be moved by issuing a (e.g., one and only one or more) read command to the system storage 92, instructing the system storage 92 to read to memory the network data between adjacent offsets, such as in a sequence of storage addresses (or locations within a file) beginning with the first offset and ending with the second offset in the pair of offsets. The transferred data may be transferred to a (e.g., one and only one or more) identified sub-buffer 42, 44, and 46 in system memory 30, such as a sub-buffer identified by the write pointer 50. In other embodiments, multiple commands may be used to transfer the data from system storage to a single sub-buffer or a single command may transfer data to multiple sub-buffers.

The process 106, in some embodiments, further includes designating the identified sub-buffer to which the batch of data was moved as being unexhausted, as illustrated by block 118. Designating the sub-buffer as unexhausted may include changing the state of the corresponding exhausted state value 56 of that sub-buffer 42, 44, or 46, for example from a value of true to a value of false. In this example, unexhausted sub-buffers contain data yet to be sent via the network interface.

System memory 30 and system storage 32 serve different roles in some embodiments due to tradeoffs between capacity, persistence, and speed. Generally, the speed with which data is written to, or read from, system memory 30 is substantially higher than the speed with which data is read from, or written to, system storage 32, but the capacity available in system storage 32 for a given price is typically substantially higher. System storage 32 is generally used to store larger amounts of data persistently (e.g. when power to a computer system is removed), but due to lower data rates, the system storage 32 may act as a bottleneck when replaying (or capturing) data. Further, the rate with which system storage 32 returns data may fluctuate. Buffering the data in system memory 30 is expected to accommodate these fluctuations, drawing down the buffer when the data rate of system storage 32 temporarily drops, and filling the buffer 40 when the data rate of the system storage 32 rises or the rate at which replay traffic is sent drops, as described below. Further, the transferring the network data to system memory in groups identified by the pre-calculated offsets is expected to allow the buffering thread 98 to transfer the data with fewer read commands being issued to the system storage 32, which is expected to result in higher rates of data transfer than would otherwise be achieved. Not all embodiments, however, provide these benefits or use these techniques.

Figure 6:
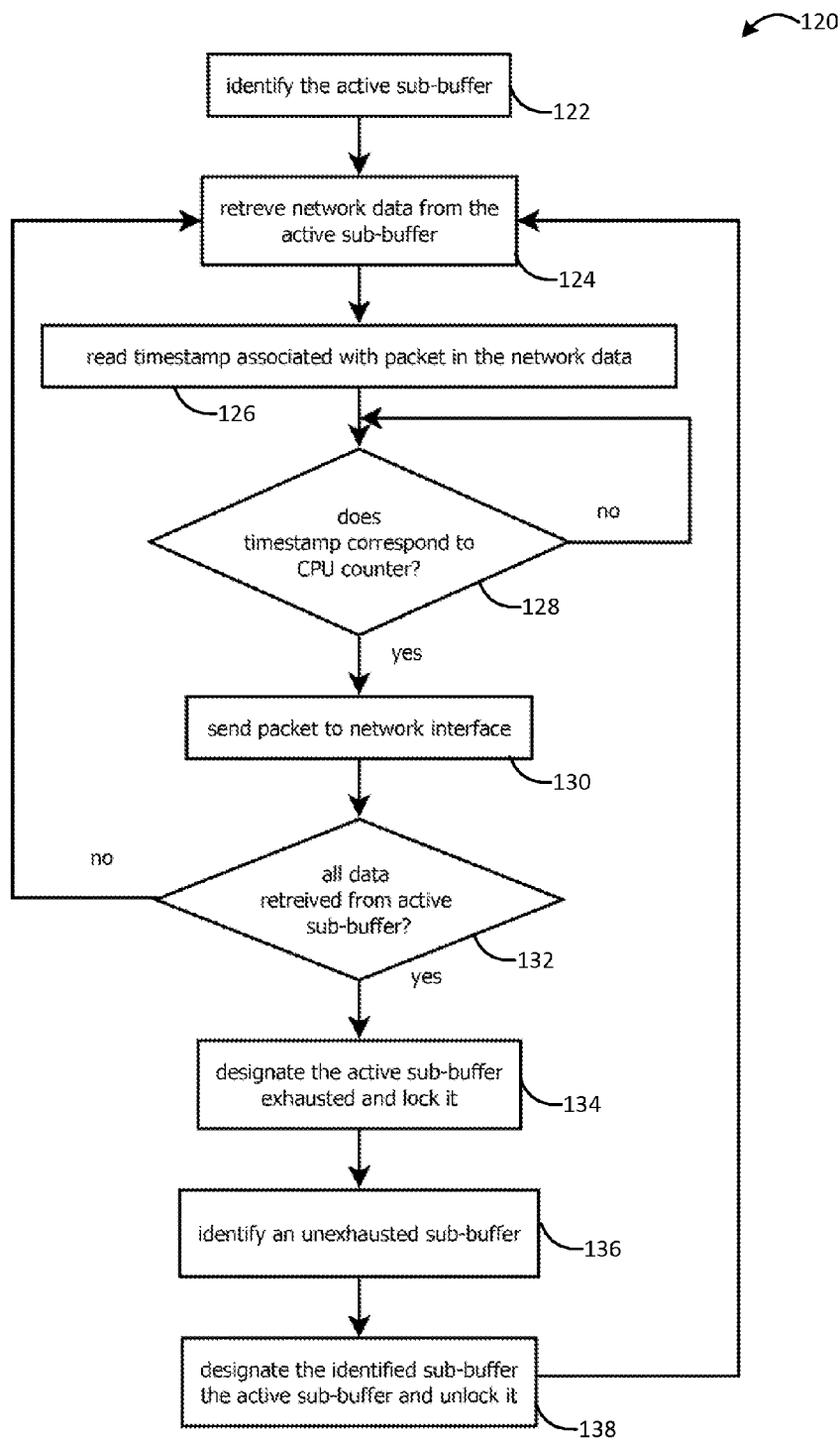

FIG. 6 illustrates an embodiment of a process 120 that sends data from a buffer. In some embodiments, the process 120 is performed by the above-described sending thread 100 of FIG. 4 sending data from the buffer 40 through the network interface 28 to the recipient system 104. The data may be sent in the order in which the data was received when the data was captured and in accordance with timestamps associated with each packet in the data, such that pauses between packets of network data are re-created when sending the network data. The process of FIG. 6 may be performed concurrent with the process of FIG. 5, e.g., when (in response to) a threshold number of sub-buffers being filled by the process of FIG. 5, when a threshold amount of time has passed since the start of the process or FIG. 5, or in response to some other signal, such that buffer 40 contains data to accommodate fluctuations in the sending rate and the rate at which data is read from storage 32.

The process 120, in some embodiments, includes identifying the active sub-buffer, as indicated by block 122. In some implementations, one and only one sub-buffer is designated as active, though other embodiments may have multiple active sub-buffers. Identifying the active sub-buffer may include identifying the active sub-buffer with the value in the read pointer 48 corresponding to an identifier 58 of one of the sub-buffers 42, 44, or 46.

The process 120, in some embodiments, further includes retrieving network data from the active sub-buffer, as indicated by block 124. As noted above, embodiments are not limited to network data, and other types of data may be sent in accordance with the present techniques. In some embodiments, retrieving the network data from the active sub-buffer includes retrieving a next packet (e.g. one and only one packet, or multiple packets) in an ordered sequence of packets of network data, where the packets are sequenced in the order in which the packets were captured.

The process 120 further includes reading a timestamp associated with a retrieved packet of the network data, as indicated by block 126. As noted above, the timestamps, in some embodiments, are (or correspond to, e.g., as in integer offset from) a value of a network interface timestamp counter or a CPU timestamp counter at the time the packet was received during capture. The timestamp may be associated with the packet (e.g., in a one-to-one relationship or approximately one-to-one relationship) in which each network packet has a distinct timestamp relative to the other network packets, though not all embodiments use this technique, and in some cases consecutive packets may have the same timestamp value.

The process 120 further includes determining whether the timestamp corresponds to a CPU timestamp counter (or other system clock), as indicated by block 128. For example, a starting time corresponding to when a first packet was received during data capture may be stored and associated with the stored network data. In some cases, this starting time and timestamps associated with each packet of stored network data are equal to (or determined based on) a timestamp counter of the network interface, which may have a different period than the CPU timestamp counter, and typically a much longer period. For instance, a network interface timestamp counter operating at 1 GHz may increment each nanosecond, while the CPU timestamp counter operating at 3 GHz may increment in approximately 333 picoseconds. To determine correspondence, the ratio of these timestamp counter frequencies (or periods) may be used to translate between CPU time and network interface time. Further, an offset time may be calculated by subtracting the starting time of the data capture from the current time, and then, packets may be sent when (in response to) the translated times, less the offset, are equal, such that, for instance, a packet received 10.000003 seconds after capture starts is set 10.000003 seconds after replay starts. In other embodiments, other clock signals may be used instead of, or in combination with, the CPU timestamp counter. If the timestamp does not correspond with the CPU timestamp counter, the process 120 continues to wait until the CPU timestamp counter increments to a value that does correspond. Alternatively, when the timestamp corresponds to the CPU timestamp counter, the process 120 may proceed to the next step.

In some embodiments, the present process includes disabling certain modes of operation of the CPU that might interfere with the timing at which packets are sent. For instance, lower power modes of operation of the CPU may be disabled and throttling may be disabled to keep the CPU timestamp counter operating at a relatively constant frequency.

In some embodiments, the process 120 includes sending the packet to the network interface, as indicated by block 130. Sending the packet may include sending the packet on a network, such as an Ethernet network to a recipient system 104, which, for example, may be an intrusion detection system, such as the intrusion detection system described below with reference to FIGS. 7 and 8 undergoing testing to evaluate intrusion detection models. In some embodiments, the sent data is sent to a loopback address, and the process of FIG. 8 is performed on the data stream to test detection models concurrent with replaying the data. Sending the packet at the time the CPU timestamp counter corresponds with the timestamp is expected to cause the packets to be sent from the system with an inter-packet timing that approximates with relatively high fidelity the inter-packet timing with which the packets were received during capture, e.g., with a timing resolution approximately equal to that of the CPU timestamp counter or the network interface timestamp counter.

The process 120, in some embodiments, further includes determining whether all data has been retrieved from the active sub-buffer, as indicated by block 132. Determining whether all data has been retrieved may include determining whether a last packet in a sequence of packets in the active sub-buffer has been retrieved. In response to determining that all the data has not been retrieved, the process 120 may return to block 124 and continue to iterate through the sequence of packets in the active sub-buffer until all of the packets have been retrieved. Alternatively, in response to determining that all of the data has been retrieved from the active sub-buffer, the process 120 may proceed to the next step.

In some embodiments, process 120 includes designating the active sub-buffer as exhausted and locking the active sub-buffer, as indicated by block 134. Designating the active sub-buffer as exhausted may include changing the exhausted-state value 56 of the active sub-buffer, and locking the active sub-buffer may include changing a lock state 54 of the active sub-buffer. In some embodiments, sub-buffers are locked with a mutex, a spinlock, or other variable configured to facilitate coordination between threads.

In some embodiments, the process 120 further includes identifying an unexhausted sub-buffer, as illustrated by block 136. Identifying an unexhausted sub-buffer may include incrementing or decrementing the read pointer 48 of FIG. 4 and reading the exhausted-state value 56 of the sub-buffer 42, 44, or 46 corresponding to the read pointer 48 to confirm that the sub-buffer is unexhausted. Some embodiments may wait until the state of the next sub-buffer is unexhausted if needed.

In some embodiments, the process 120 includes designating the identified sub-buffer as the active sub-buffer and unlocking this sub-buffer, as indicated by block 138. The identified sub-buffer may be designated as active by storing in the read pointer 48 the value of the identifier 58 of the corresponding sub-buffer 42, 44, or 46. Further, the sub-buffer may be unlocked by changing the state of a corresponding lock. After performing step 138, the process 120 may return to step 124 and retrieve network data from this newly identified and unlocked active sub-buffer.

The process 128 is expected to send data from the buffer 40 in the sequence in which the data was captured and with timing approximating the timing with which the data was captured with relatively high fidelity. Further, the exhausted state values and locking the active sub-buffers is expected to facilitate concurrent processing for higher rates of data transfer. Not all embodiments, however, provide these benefits or use these techniques.

In some embodiments, the process 106 of FIG. 5 and the process 120 of FIG. 6 are performed concurrently by different threads executed by, for example, different cores or different hyperthreads of the CPU 26. Further, in some embodiments, multiple buffering thread 98 and multiple sending threads 100 may be executed, for example with odd-numbered packets or groups of data being transferred by one buffering thread and even-numbered packets or groups of data being transferred by another buffering thread, and odd-numbered packets being sent by the sending thread 100 and even-numbered packets being sent by different sending thread. Or a collection of threads may perform both roles, alternating between a sending mode and a buffering mode. Further, in some embodiments, processes 106 and 120 may be performed by different computing processes.

Figure 7:
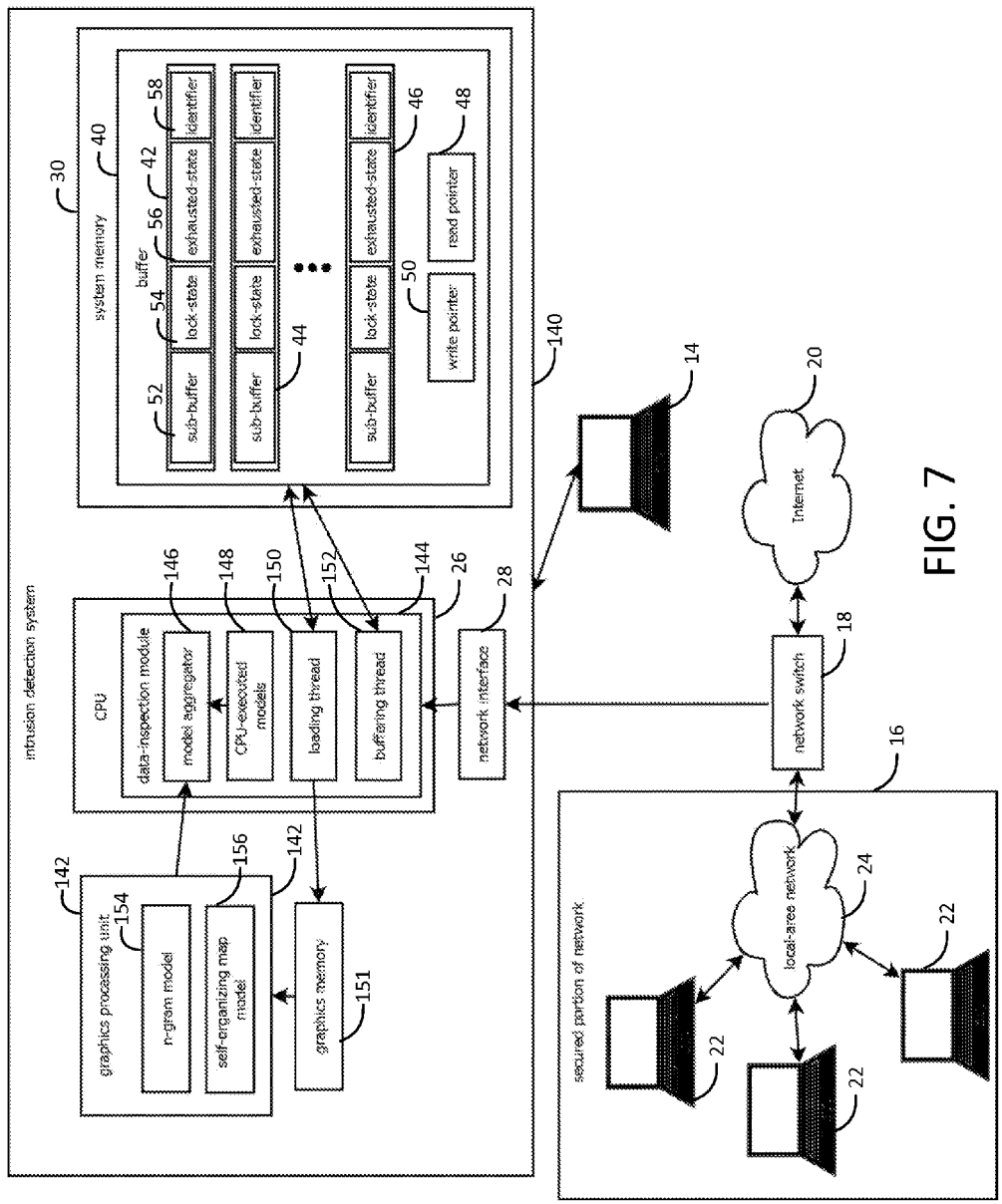
FIG. 7 illustrates an intrusion detection system in accordance with embodiments of the present techniques.
Figure 8:
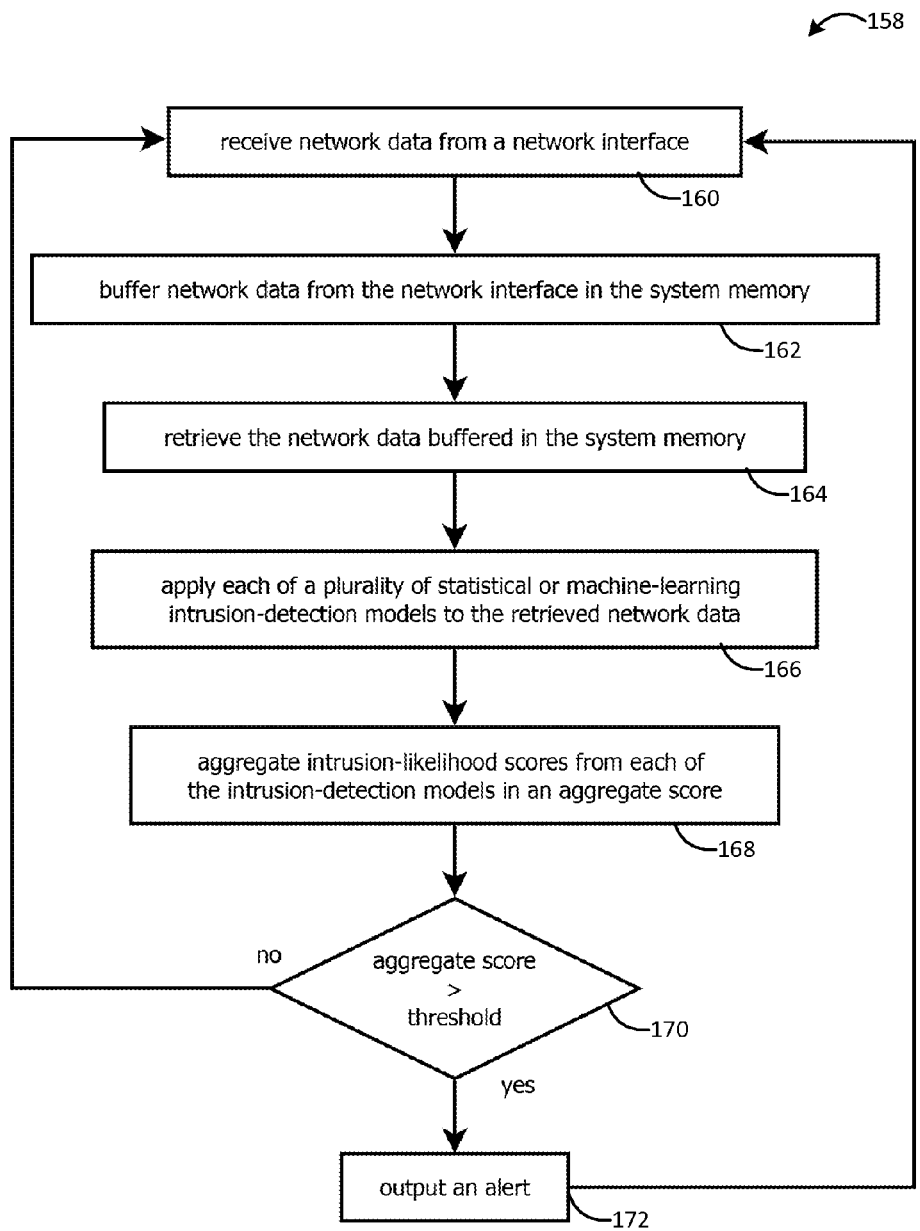
FIG. 8 illustrates a process for detecting intrusions in accordance with embodiments of the present techniques.

FIG. 7 illustrates an embodiment of an intrusion detection system 140. In some embodiments, the intrusion detection system 140 is instantiated by operating the above-described computing hardware in a different mode of operation. For example, the system 140 may include the CPU 26, the network interface 28, and the system memory 30 described above, and the system 140 may communicate with the above-described administrator device 14, network switch 18, Internet 20, and secured network 16. In some embodiments, the intrusion detection system 140 includes the above described capture module but not the replay module, or vice versa, or neither of these features, which is not to suggest that other features may not also be omitted in some embodiments.

The intrusion detection system 140 may be operable to monitor network traffic between the secured portion of the network 16 and the Internet 20, for example all network traffic, substantially all network traffic, or a subset of network traffic. The intrusion detection system 140 may further be operable to detect network traffic indicative of malicious activity, such as denial of service attacks, viruses, and the like. Further, some embodiments may be configured to detect anomalies in network traffic indicative of a zero-day attack by statistically analyzing traffic to identify new anomalies (e.g., zero-day attacks), and some embodiments may analyze traffic in real-time or near real-time, for example within one millisecond, one to five seconds, one to five minutes, or one hour.

To these ends, some embodiments of the intrusion detection system 140 apply a plurality of different models to the network data and aggregate signals from each of those models into an aggregate signal indicative of whether certain network traffic is indicative of an attack. The combination of models is expected to yield fewer false positives and fewer false negatives than individual models applied in using traditional techniques. Further, in some embodiments, these models are executed on the CPU 26 or the graphics processing unit 142, depending on which computing architecture is well-suited to the computations associated with the model, thereby facilitating relatively fast processing of models on the graphics processing unit 142 that would otherwise be relatively slow on the CPU 26. Further, in some embodiments, the intrusion detection system 140 analyzes network data at relatively high rates using relatively inexpensive hardware by using the above-described buffering techniques to form batches of data to be analyzed in parallel (e.g., concurrently) by the graphics processing unit 142. To this end, the analysis of network traffic may be performed concurrent with buffering traffic.

In this embodiment, the CPU 26 executes a data-inspection module 144, which may be one or more computing processes each executing one or more threads, each corresponding to one or more of a model aggregator 146, CPU-executed models 148, a saving thread 150, and a buffering thread 152. The saving thread 150 and buffering thread 152 may be similar or identical to the saving thread 36 and the buffering thread 38 described above with reference to FIG. 1 and may perform the process of FIGS. 2 and 3 with the distinction that the saving thread 150 moves data into graphics memory 154 of the graphics processing unit 142, rather than to system storage 32, in some embodiments. To this end, system memory 30 may include the above described buffer 40. Again, it should be noted that the presently described functional blocks should not be interpreted as limiting the present techniques to a particular organization of code or hardware by which their functionality is provided, as such code or hardware may be distributed, conjoined, intermingled, or otherwise differently arranged.

The model aggregator 146 may receive signals, such as intrusion-likelihood scores, indicative of the degree to which each individual model indicates that recent network traffic represents an attack. For example, some models may be well-suited to detecting a particular type of attack, and those models may output a relatively high intrusion-likelihood score for that type of attack, while other models may output a value indicative of either no attack or no signal. The model aggregator 146 may combine the scores into an aggregate score, and if the aggregate score exceeds a threshold, the model aggregator 146 may, in some embodiments, indicate that an attack is occurring, a type of attack, and a confidence value indicative of the likelihood that the models have correctly identified an attack. This alarm data may be logged, and in response to an attack, certain network traffic may be blocked, such as certain IP addresses, certain packets, certain sessions, or certain files, and messages, such as emails or text messages, may be sent to an administrator, in some embodiments. Some embodiments classify network traffic on a packet-by-packet basis, and packets classified as anomalous are blocked.

Certain models are amenable to being executed on the CPU 26, such as models in which much of the processing occur sequentially and is not amenable to being performed in parallel. Examples of such models include packet-time stamp model (e.g., based on statistics of interpacket timing) and a packet size model (e.g., based on statistics of packet size).

The graphics processing unit 142 may execute various models in which processing is amenable to being performed in parallel, such as an n-gram model 154, and a self-organizing map model 156. The n-gram model and self organizing map 156 may operate on data retrieved from graphics memory 151 and may each output intrusion-likelihood scores to the model aggregator 146. Other types of models that may be executed on a graphics processing unit 142 includes spaced n-gram model, frequency n-gram model, a weighted n-gram model, or other neural network, machine learning, or statistical models. In some embodiments, the models executed on the GPU perform deep packet inspection. In some cases, models involve computations on both the GPU and the CPU, e.g., in a pipeline with some stages using only the CPU and some stages using the GPU.

In some embodiments, the intrusion detection system 140 of FIG. 7 performs a process 158 for detecting intrusions, illustrated by FIG. 8.

In some embodiments, the process 158 includes receiving network data from a network interface, as illustrated by block 160, and buffering the network data from the network interface in system memory, as indicated by block 162. Receiving and buffering may be performed by the above-mentioned buffering thread 152 storing the received data in the buffer 40 in accordance with the techniques described above.

In some embodiments, the process 158 further includes retrieving the network data buffered in the system memory, as indicated by block 164. Retrieving the network data may be performed by the above-mentioned loading thread 150 using the techniques described above with reference to FIG. 3 except that the data is, instead of being written to system storage, input to each of a plurality of statistical or machine-learning intrusion detection models, as indicated by block 166. To this end, the loading thread 150 (FIG. 7) may write the retrieved data to the graphics memory 151 for access by the models of the graphics processing unit 142. Further, the data may be also made available to the CPU-executed models 148, also of FIG. 7. The state of each of the models (for those models in which state is maintained) may be updated to reflect information present in the retrieved network data, and intrusion-likelihood scores from each of these models may be updated and communicated to the model aggregator 146.

In some embodiments, the process 158 further includes aggregating intrusion-likelihood scores from each of the intrusion detection models in an aggregate score, as indicated by block 168. The scores may be aggregated by, for example, providing the scores as inputs to a neural network, support vector machine, a Bayesian classifier, or other machine-learning algorithm or a weighted sum of the scores, maximum of scores, median of scores, or other formula configured to combine the scores into a determinative value indicating whether an attack is occurring. Parameters of such algorithms may be tuned based on capture and replay of network traffic or offline analysis of captured data in accordance with the above techniques.

In some embodiments, the process 158 further includes determining whether the aggregate score is greater than a threshold score, as indicated by block 170. If the aggregate score exceeds the threshold, in response, the process 158 outputs an alert, as indicated by block 172, and returns to step 160 to continue monitoring network data. Outputting an alert may include logging a record of the alert in memory (or system storage) and transmitting a message, for example an email or SMS message to an administrator, depending upon the severity of the alert. Alternatively, if the aggregate score does not exceed the threshold, in response, the process 158 returns to step 160 to continue monitoring network data.

The process 158, in some embodiments, aggregates scores from a plurality of different models, each model potentially having different sensitivity to different types of attacks, and as a result, is expected to exhibit fewer errors than conventional systems due to the combined effect of the models. In some embodiments the model aggregator 146 and models 154, 156, and 148 may be collectively referred to as an ensemble learning model. Further, the system 140 and process 158, in some embodiments, process a subset of the models (or a subset of the computations of a given model) on a graphics processing unit, which is expected to facilitate relatively fast processing of models amenable to highly parallel processing, and the buffering techniques described above are expected to facilitation parallel processing of batches of data by the graphics processing unit 142. It should be noted, however, that various engineering trade-offs are envisioned, and not all of the benefits described herein are offered by all embodiments in accordance with the present techniques, as various trade-offs relating to cost, performance, and reliability may be made by system designers while still using the techniques described herein.

Program code that, when executed by a data processing apparatus, causes the data processing apparatus to perform the operations described herein may be stored on a tangible program carrier. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage (e.g., CD-ROM and/or DVD-ROM, hard-drives), or the like. Such memory may include a single memory device and/or a plurality of memory devices (e.g., distributed memory devices). In some embodiments, the program may be conveyed by a propagated signal, such as a carrier wave or digital signal conveying a stream of packets.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A tangible non-transitory machine-readable medium storing instructions that when executed by a data processing apparatus cause the data processing apparatus to perform operations comprising:
   writing network data from a network interface to a buffer in a system memory, wherein the buffer comprises a plurality of sub-buffers arranged in a circular sequence and writing the network data from the network interface to the buffer in the system memory comprises:
      writing the network data to an active unlocked sub-buffer among the plurality of sub-buffers,
      locking the active sub-buffer, designating an unlocked sub-buffer as the active sub-buffer, and
      after ascertaining that the network data stored in the locked sub-buffer has been written to system storage, unlocking the locked sub-buffer; and
   concurrent with writing the network data to the buffer in the system memory, writing the network data from the buffer in the system memory to the system storage.

2. A method, comprising:
   writing network data from a network interface to a buffer in a system memory, wherein the buffer comprises a plurality of sub-buffers arranged in a circular sequence and writing the network data from the network interface to the buffer in the system memory comprises:
      writing the network data to an active unlocked sub-buffer among the plurality of sub-buffers,
      locking the active sub-buffer,
      designating an unlocked sub-buffer as the active sub-buffer, and
      after ascertaining that the network data stored in the locked sub-buffer has been written to system storage, unlocking the locked sub-buffer; and
   concurrent with writing the network data to the buffer in the system memory, writing the network data from the buffer in the system memory to the system storage.

3. The method of claim 2, comprising:
   prior to writing the network data to the system storage, ascertaining that more than a threshold duration of time has elapsed since the network data being written to system storage was stored in the buffer in the system memory.

4. The method of claim 2, wherein:
   a write pointer cycles through the plurality of sub-buffers arranged in the circular sequence, the write pointer identifying one of the plurality of sub-buffers.

5. The method of claim 2, wherein locking the active sub-buffer comprises:
   locking the active sub-buffer with a mutex;
   locking the active sub-buffer with a spinlock;
   changing a variable state; or
   incrementing or decrementing a semaphore.

6. The method of claim 2, wherein writing the network data from the buffer in the system memory to the system storage, comprises:
   writing the network data from the buffer in the system memory to at least one preexisting file in the system storage.

7. The method of claim 2, wherein writing the network data from the buffer in the system memory to the system storage, comprises:
   concurrently writing different portions of the network data from the buffer in the system memory to each of a plurality of storage drives.

8. The method of claim 7, wherein concurrently writing the network data from the buffer in the system memory to each of a plurality of storage drives comprises:
   writing to eight or more hard disk drives.

9. The method of claim 2, wherein writing network data from the network interface to the buffer in the system memory comprises:
   capturing all network traffic on a ten gigabit per second network with a single computing device.

10. The method of claim 2, wherein writing the network data to the active unlocked sub-buffer among the plurality of sub-buffers comprises:
    associating packets with timestamps indicative of a time at which each packet was received.

11. The method of claim 2, wherein writing the network data to the active unlocked sub-buffer among the plurality of sub-buffers comprises:
    ascertaining which sub-buffer among the plurality of sub-buffers in the system memory is active according to a pointer to the active sub-buffer.

12. The method of claim 2, wherein writing the network data to the active unlocked sub-buffer among the plurality of sub-buffers comprises:
    writing the network data to a portion of memory allocated to the network interface with a driver of the network interface with direct memory access to the portion of memory; and
    writing the network data to the active unlocked sub-buffer from the portion of memory.

13. The method of claim 2, wherein locking the active sub-buffer comprises:
    determining that the active unlocked sub-buffer is full in response to an occupied space of the active unlocked sub-buffer exceeding a size of the active buffer less a maximum specified packet size, and wherein only one of the sub-buffers among the plurality of sub-buffers is designated as active at a time and network data is not written to inactive sub-buffers among the plurality of sub-buffers.

14. The method of claim 2, wherein designating the unlocked sub-buffer as the active sub-buffer comprises:
    changing a value of a write pointer that identifies one of the plurality of sub-buffers.

15. The method of claim 2, wherein writing the network data from the buffer in the system memory to the system storage comprises:
    identifying the locked sub-buffer with a read pointer; and
    writing the network data in the locked sub-buffer to the system storage.

16. The method of claim 2, wherein writing the network data in the locked sub-buffer to the system storage comprises writing multiple frames of the network data in the locked sub-buffer to the system storage with one and only one write command.

17. The method of claim 2, wherein writing the network data from the buffer in the system memory to the system storage comprises:
    identifying a pre-formed file in the system storage and overwriting the file.

18. The method of claim 2, comprising:
    replaying the network data stored in the system storage; and
    testing an intrusion detection system with the replayed network data.

19. The method of claim 18, comprising:
adjusting parameters of the intrusion detection system in response to the testing.

* * * * *